United States Patent [19]

Killiany et al.

[11] Patent Number: 5,058,462

[45] Date of Patent: Oct. 22, 1991

[54] PARKLOCK CABLE LOCK BOX

[75] Inventors: Andrew W. Killiany, Birmingham; Arthur L. Spease, Bloomfield Hills, both of Mich.

[73] Assignee: Teleflex Incorporated, Limerick, Pa.

[21] Appl. No.: 468,080

[22] Filed: Jan. 22, 1990

[51] Int. Cl.$^5$ ............................................. B60K 41/26
[52] U.S. Cl. .................................... 74/878; 192/4 A; 70/245
[58] Field of Search ................. 70/245, 246, 247, 248, 70/254; 192/4 A; 74/878, 473 R, 483 R, 500.5, 502.4; 180/271

[56] References Cited

U.S. PATENT DOCUMENTS

| | | | |
|---|---|---|---|
| 3,490,255 | 1/1970 | Wight et al. | 70/252 |
| 3,942,614 | 3/1976 | Thompson | 74/483 R X |
| 4,096,930 | 6/1978 | Viscardi | 192/4 A |
| 4,278,154 | 7/1981 | Cymbal et al. | 192/4 A |
| 4,683,774 | 8/1987 | Memmola | 74/502.4 |
| 4,887,702 | 12/1989 | Ratke et al. | 192/4 A |
| 4,905,802 | 3/1990 | Gotoh | 192/4 A |
| 4,909,096 | 3/1990 | Kobayashi | 192/4 A |
| 4,917,224 | 4/1990 | Gokee | 192/4 A |
| 4,938,042 | 7/1990 | Muramatsu | 70/245 |
| 4,947,967 | 8/1990 | Kito et al. | 192/4 A |

*Primary Examiner*—Leslie A. Braun
*Assistant Examiner*—Matthew Stavish
*Attorney, Agent, or Firm*—Reising, Ethington, Barnard, Perry & Milton

[57] ABSTRACT

A transmission lock assembly (10) of the type for retaining a vehicle gear selector mechanism (20) in the park position until the vehicle brake pedal (54) is depressed. The assembly includes a first conduit (58) having a housing (60). The conduit (58) and housing (60) are adapted to be connected to a steering column (48) of the vehicle (12). A first core element (64) is slideably disposed in the conduit (58) and housing (60) and is connected to the gear selector mechanism (20). A block cam (70) is fixedly disposed on the first core element (64) and is moveable within the housing (60). A locking lever (76) engages the block cam (70) to prevent movement thereof in the locked condition. A release lever (86) is pivotally secured within the housing (60) and engages the locking lever (76) to move same between the locked and unlocked conditions. A second core element (90) is slideably supported by a second conduit (104) and interconnects the brake pedal (54) with the release lever (86). As the brake pedal (54) is depressed, the second core element (90) pivots the release lever (86) and thereby the locking lever (76) to move the locking lever (76) to the unlocked position and permit movement of the first core element (64).

41 Claims, 2 Drawing Sheets

PARKLOCK CABLE LOCK BOX

TECHNICAL FIELD

The present invention relates to a vehicle transmission lock assembly for retaining a vehicle gear selector lever in the park position until the vehicle park brake is depressed. The assembly is for preventing inadvertent movement of the vehicle as the vehicle gear shift selector lever is moved from the park position to an operative position.

BACKGROUND OF THE INVENTION

Often times, when a vehicle, particularly an automobile which equipped with an automatic transmission, is placed in gear by moving the gear shift selector from the park position to an operative position, the vehicle has a tendency to move suddenly forwardly or rearwardly. This condition is most prevalent when the vehicle is initially started and is in the fast idle condition. In this condition, the engine is turning at higher revolutions per minute then under normal operating conditions. This power is suddenly transmitted to the vehicle when the gear selector lever is moved from the park position causing the vehicle to lurch either forwardly or rearwardly. This sudden movement can possibly create a hazardous situation. Specifically, if a person or animal is near the vehicle, or the vehicle is parked adjacent a stationary object, the vehicle, upon sudden rapid movement may strike the nearby obstacle causing harm. Typically, the sudden movement occurs before the vehicle operator can react to prevent the movement.

It is a further problem in today's smaller vehicles that the vehicle brake pedal is disposed very near the vehicle accelerator pedal. Both pedals are typically small and can be easily mistaken by a driver who is not paying strict attention to which pedal is being depressed. Thus, it is not uncommon for a driver to inadvertently depress the accelerator pedal believing it is the brake pedal when moving the gear selector lever thereby causing the car rapidly accelerate.

Also, a problem exists when a vehicle operator leaves an automobile with the engine running and having a small child in the vehicle. The small child may attempt to remove the selector lever from the park position. Generally, a small child is neither large nor dexterous enough to simultaneously depress the vehicle brake pedal and move the gear selector lever from the parked position.

It is, therefore, desirable to equip the vehicle with an assembly which positively prevents movement of the vehicle gear selector lever from the park position until the vehicle brake pedal is actuated.

U.S. Pat. No. 4,187,935 to O'Hern, issued Feb. 12, 1980 discloses such an assembly which requires actuation of the vehicle brake pedal prior to movement of the gear selector lever. The assembly includes a rod disposed on the end of the gear selector lever which rotates as the gear selector lever is moved. A blocking plate is pivotally disposed behind the vehicle firewall near the steering column. The blocking plate is spring biased to a locked position. When in the locked position, the blocking plate engages the rod on the gear selector lever shaft and thereby prevents movement on the gear selector. To move the locking plate to the unlocked position, the vehicle brake pedal is depressed. A solenoid is actuated by the actuation of the brake pedal and moves the blocking plate against the biasing of the spring to an unlocked position. In the unlocked position, the rod on the end of the gear selector lever shaft is free to rotate. This allows the gear selector lever to freely move from the parked position to the operative positions. This prior art assembly requires installation of a complex blocking assembly which is both time and labor intensive.

SUMMARY OF THE INVENTION AND ADVANTAGES

According to the present invention there is provided a transmission lock assembly of the type for retaining a vehicle gear selector lever in the parked position until the vehicle brake pedal is actuated. The assembly comprises first conduit means for fixed attachment to the vehicle and first core element means slideably disposed in the first conduit means and adapted for connection with a gear selector lever. The assembly includes locking means engageable with the core element and moveable between locked and unlocked positions for preventing movement of the first core element means when the assembly is in the locked condition. The assembly is characterized by release means extending from a primary end at a position adjacent the locking means to a secondary end at a position remote from a locking means. The release means is for moving the locking means between the locked and unlocked conditions in response to a force applied to the release means at the secondary end.

Accordingly, there is provided an assembly for positively retaining a vehicle gear shift selector lever in the park position until the vehicle brake pedal is depressed. The assembly is easily installed onto existing vehicle ignition assemblies.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
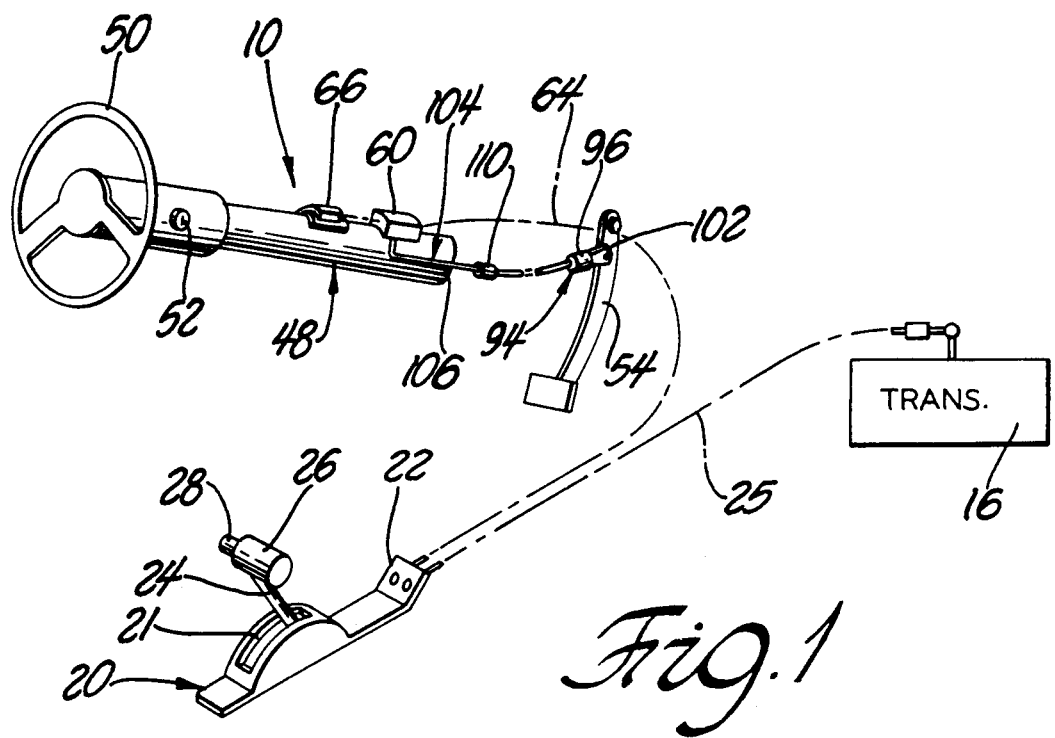
FIG. 1 is a schematic view of the transmission lock assembly made in accordance with the instant invention.
Figure 2:
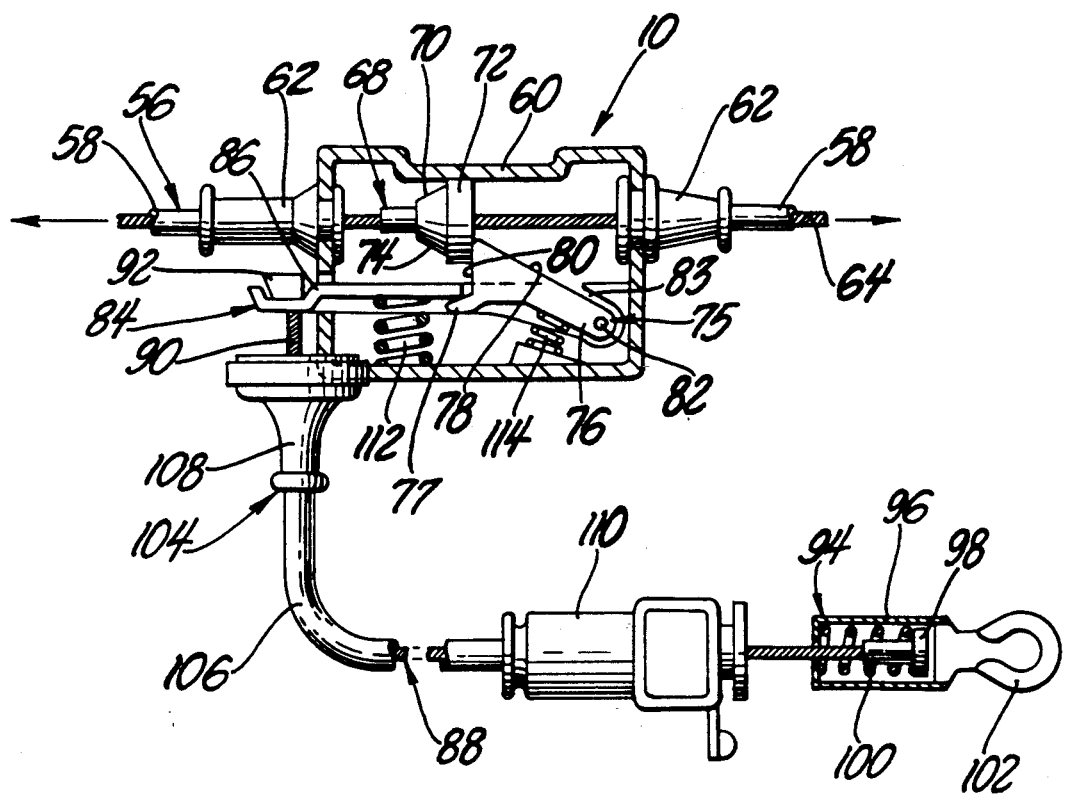
FIG. 2 is a cross sectional view of the locking and release mechanism of the instant invention.

A transmission lock assembly of the type for retaining a vehicle selector lever in the park position until the vehicle brake pedal is actuated is generally shown at 10 in FIGS. 1 and 2.

The assembly 10 is for disposition in a vehicle 12. The vehicle 12 has an engine 14 for supplying power. Further, the vehicle 12 includes a transmission 16 for transmitting the power from the engine 14 to the vehicle 12. Specifically, the transmission takes the power from the engine and transmits it to the vehicle wheels 18.

The vehicle 12 further includes a gear selector mechanism generally indicated at 20. The gear selector mechanism 20 of the present invention is preferably a floor mount type. The mechanism includes a gear selector housing 22 disposed on the vehicle floor. A gear selector lever 24 extends within the gear selector housing 22 and outwardly therefrom through an elongated opening 21 in the housing. The gear selector lever 24 has a handle 26 transversely mounted on the top thereof. The handle 26 has a push button 28 thereon for receiving a force.

The gear selector lever 24 is pivotal in the opening 21 in response to force applied to the handle 26. The gear selector lever 24 is moveable between a park position and a plurality of operative positions. By moving the lever 24 from the park position to an operative position, the transmission is controlled. That is, the gear selector lever 24 is for operating the transmission by placing it in the desired operative position. Specifically, a transmission cable or core element 25 interconnects the gear selector lever 24 and the transmission 16. As the gear selector lever 24 moves, it imparts movement to the transmission core element 25 which, in turn, moves the transmission 16 to the desired position.

Figure 3:
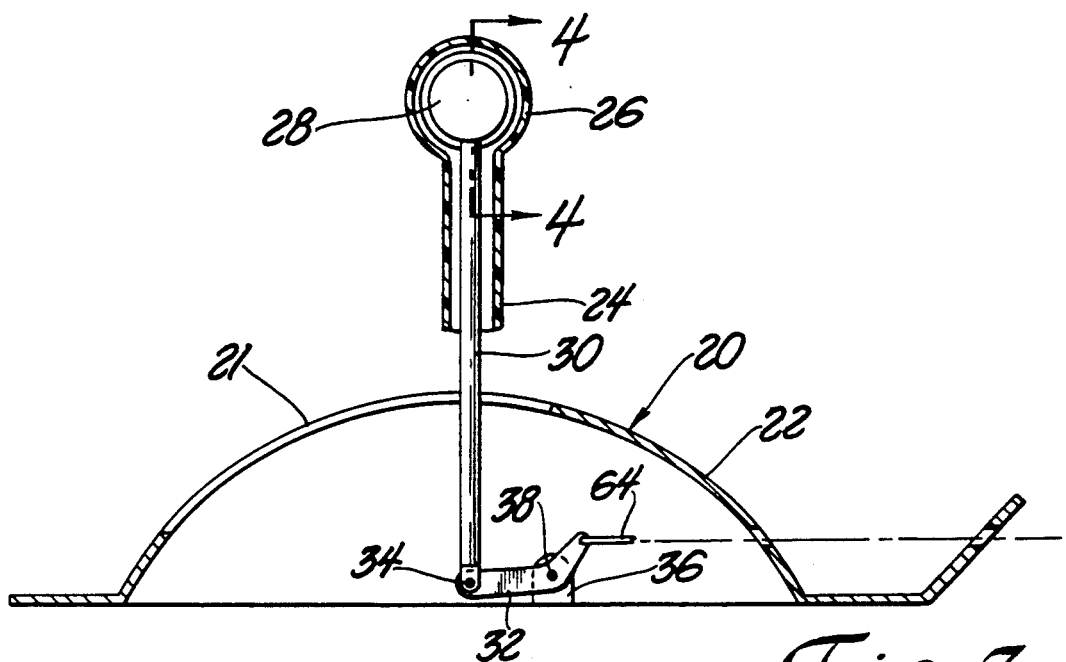
FIG. 3 is a cross sectional view of the gear selector mechanism.

As best viewed in FIG. 3, the gear selector mechanism 20 also includes a push rod 30 slideably disposed through the gear selector lever 24. The push rod 30 extends the length of the gear selector lever 24 and into the handle 26. The push rod 30 is spring biased upwardly as viewed in FIG. 3. The push rod 30 is pivotally connected at its lower end to a pivot plate 32. The push rod 30 is connected to the pivot plate 32 by a pin 34. The pivot plate 32 is pivotally secured to the gear selector housing 22. Specifically, the gear selector housing 22 has an flange 36 extending upwardly from the base portion thereof. The pivot plate 32 is pivotally connected to the upwardly extending flange 36 by a pivot pin 38.

Figure 4:
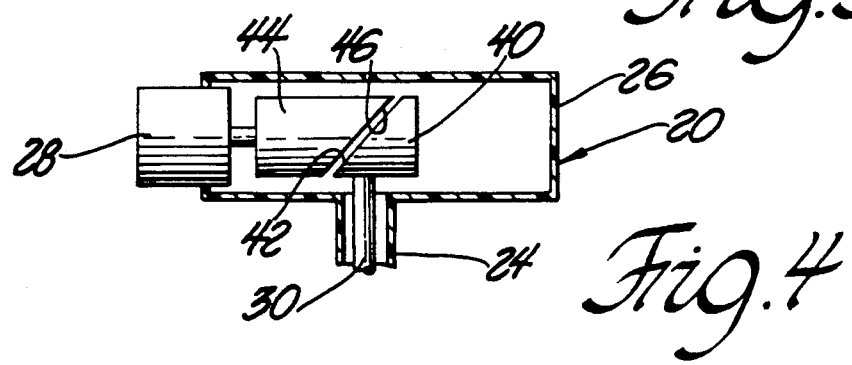
FIG. 4 is a cross sectional view partially broken away of the gear selector mechanism.
Figure 5:
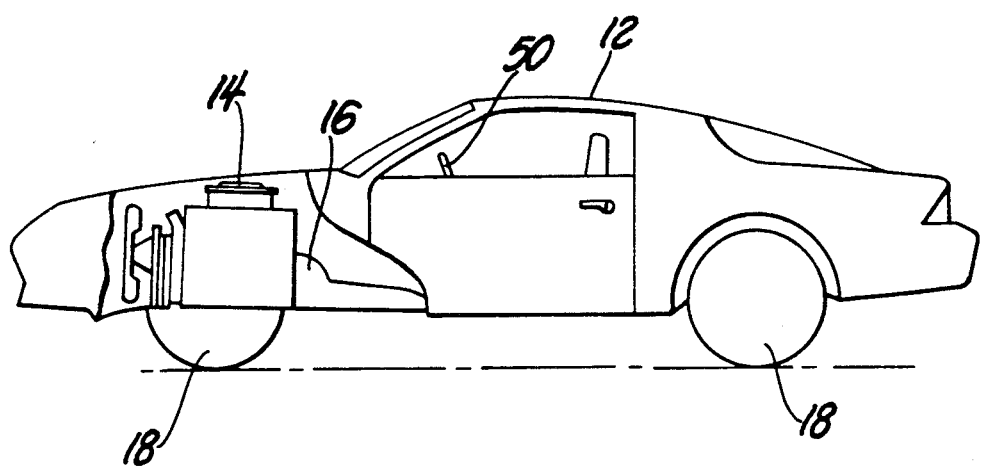
FIG. 5 is a side view of a vehicle including the transmission lock assembly.

The push rod 30 has a cam portion 40 fixedly secured thereto, as best seen in FIG. 4. The cam portion 40 has a tapered surface 42 for receiving a force. The push button 28 has a push bar 44 fixedly secured thereto. The push bar 44 has a tapered surface 46 for mating engagement with the tapered surface 42 of the cam portion 40. When a force is applied to the push button 28 and the assembly 10 is in the unlocked position, the push bar 44 is moved in response to the force applied to the button 28 (to the right as viewed in FIG. 4). This causes the surface 46 to engage the tapered surface 42 of the cam portion 40. The cam portion 40 is forced downwardly as viewed in FIG. 4. This movement causes the push rod 30 to move downwardly as viewed in FIGS. 3 and 4. The pivot plate 32 is then pivoted about the pivot pin 38. When the button 28 is moved in, the gear selector lever 24 can moved from the park position to an operative position. When the push button 28 is not depressed, the gear selector lever 24 can not be removed from the park position. The gear selector lever 24 is retained until the push button 28 is depressed by any means well known in the art.

The vehicle 12 further includes a steering mechanism which includes a steering column 48 and a steering wheel 50 rotatably secured on the end of the column 48. The steering column 48 typically includes a key operated mechanism 52 for starting the vehicle engine 14.

Vehicles typically have a park lock control which prohibits movement of the vehicle gear selector lever 24 from moving until the vehicle key mechanism 52 is turned from an off to an operative position. One such assembly is fully described in U.S. Pat. No. 4,712,397 to Niskanen. The transmission lock assembly which will be subsequently described can be used in conjunction with such a park lock or can be independent thereof.

The vehicle 12 also includes a brake pedal 54. The brake pedal 54 is for receiving a force from the operator of the vehicle to impede movement of the vehicle 12. That is, the vehicle brake pedal 54 normally receives a force which is transmitted to the wheels 18 to prohibit rotation thereof to impede movement of the vehicle 12.

The transmission lock assembly includes first conduit means generally indicated at 56. The first conduit means 56 is for fixed attachment to the vehicle 12. Specifically, the first conduit means 56 includes a first conduit 58 and a housing 60. The housing 60 is attached to the first conduit 58 by appropriate fittings 62. Preferably, the housing 60 is fixedly secured to the steering column 48 of the vehicle 12. The first conduit 58 is preferably of the type having an inner organic polymeric liner with a plurality of long lay wires helically disposed thereabout. An outer casing is disposed about the long lay wires.

The assembly 10 further includes first core element means 64 connected to the gear selector mechanism 20. The core element 64 is further slideably disposed in the first conduit 58 and is slideably retained within the housing 60. The first core element 64 is moveable through the first conduit 58 and housing 60. The core element 64 is supported for both rotational and longitudinal movement through the conduit 58 and housing 60. The first core element 64 is connected at one end to a fitting 66 which is operable in response to the key lock mechanism 52. At the opposite end, the first core element 64 is connected to the pivot plate 32 of the gear selector mechanism 22. The core element 64 is connected to the opposite end of the pivot plate 32 from the push rod 30. Thus, when the push rod 30 is pushed downwardly and pivots the pivot plate 32, the core element 64 is tensioned or pulled to the right, as viewed in FIG. 2.

The assembly 10 further includes locking means generally indicated at 68. The locking means or assembly 68 is engageable with the first core element 64. The locking assembly 68 is moveable between a locked and an unlocked condition in response to movement of the vehicle brake pedal 54 as will be more fully described subsequently. The locking assembly is for preventing movement of the first core element 64 and, therefore, -the gear selector lever 24 when in the locked condition. The locking assembly allows movement of the first core element 64 when it is in the unlocked condition.

The locking assembly firstly comprises travelling catch means 70. The travelling catch means comprises a block cam 70 fixedly secured to the first core element 64. The block cam 70 is fixedly disposed on the core element 64 and is situated within the housing 60. The block cam 70 includes a forward annular shoulder surface 72. The block cam 70 further includes a rearward annular sloped surface 74. The block cam 70 is moveable within the housing 60. The range or length of movement of the block cam 70 is equal to the length of travel of the push button 28. Specifically, as the button 28 is depressed, the push rod 30 is moved downwardly (FIGS. 3 and 4) an equal length to that of travel of the button 28. The pivot plate 32 pivots in response to the movement of the push rod 30. This movement is directly imparted to the first core element 64 which is thereby tensioned. As the first core element 64 moves, it moves the block cam 70. Since movement of the first core element 64 is equal to that of the push rod 30, the block cam 70 moves an equal distance. Hence, the length of movement of the block cam 70 within the housing 62 is the same as movement of the push button 28.

The locking assembly 68 further includes pawl means generally indicated at 75. The pawl means 75 comprises a locking lever 76. The locking lever 76 is pivotally disposed within the housing 60 by the pivot pin 82. The locking lever 76 is pivotal between locked and unlocked condition. Pivoting movement of the locking lever is limited in one direction by stop means or a flange 83 extending within the housing 60. That is, of a force is applied by the cam 70 on the locking lever 76 to pivot the locking lever (clockwise in FIG. 2), the locking lever 76 will engage the flange 83 and prevent pivoting movement of the locking lever 76.

The locking lever 76 includes an inclined surface 78 for engaging the sloped surface 74 of the block cam 70 to allow the block cam 70 to pass thereover to move from the unlocked position to the lock position, as will be more fully described subsequently. The locking lever 76 further includes a stop surface 80 extending downwardly from the inclined surface 78. The stop surface 80 is for engaging the forward shoulder surface 72 of the block cam 70 to prevent movement of the block cam 70 past the locking lever 76 when the locking lever 76 is in the locked position (as shown in FIG. 1). As shown in FIG. 2, the locking lever 76 is in the locked condition. When in this position, the stop surface 80 of the locking lever 76 engages the forward shoulder surface 72 of the block cam 70 to prevent movement (to the right, as viewed in FIG. 2) of the block cam 70 and thereby the core element 64. When in the unlocked position, the locking lever 76 does not engage the block cam 70.

The locking assembly 68 also preferably includes release means or a release assembly, generally indicated at 84. The release assembly 84 is adapted to mechanically interconnect the locking lever 76 with the vehicle brake pedal 54. The release assembly 84 is for moving the locking lever 76 to the unlocked condition by releasing the locking lever 76 from the block cam 70 to thereby permit movement of the first core element 64 only in response to a force applied by the brake pedal 54.

The release assembly 84 extends from a primary end at a position adjacent the locking assembly 68 to a secondary end at a position remote from the locking assembly 68. The release assembly 84 moves the locking assembly 68 and more particularly the locking lever 76 between the locked and unlocked conditions in response to a force applied to the release assembly 84 at its secondary end. More specifically, the release assembly 84 includes release lever means comprising a release lever 86. The release lever 86 is pivotally secured in the housing 60. Specifically, the release lever 86 is also pivotally secured about the pivot pin 82. The release lever 86 is for engaging the locking lever 76 and moving the locking lever 76 from the locking position to the unlocked position. That is, the locking lever 76 has a lip 77 extending therefrom to engage the release lever 86. The lip 77 only engages the release lever 86 when the release lever 86 is moved or pivoted to move the locking lever 76 from the locked to the unlocked position.

The release assembly 84 further includes second core element means generally indicated at 88. The second core element means 88 includes a second core element 90. The second core element 90 extends from a primary end to a secondary end. The second core element means 88 further includes a cap member 92. The cap member 92 is fixedly disposed on the primary end of the second core element 90. The second core element 90 extends through the release lever 86 and the cap member 92 is disposed thereon for engaging the release lever 86 for moving the same in response to a force applied at the secondary end of the second core element 90.

The second core element means 88 further includes connection means, generally indicated at 94 secured on the secondary end of the second core element 90. The connection means 94 is to connect the second core element 90 with the vehicle brake pedal 54 for moving the second core element 90 in response to a force applied to the brake 54. The connection means 94 may comprise any configuration for securing the second core element 90 with the brake pedal 54. As shown in FIG. 2, the connection means 94 comprises a housing 96 for disposition about the secondary end of the second core element 90. The secondary end of the second core element 90 has a T-fitting 98 disposed on the end thereof. A light spring 100 is interposed between the housing 96 and the T-fitting 98. A connecting portion 102 is integral with and extends from the housing 96. The connecting portion 102 is adapted to be secured to the brake pedal 54. The light spring connection 100 prevents rapid forces from being transmitted from the brake pedal to the second core element 90. The spring 100 acts as a dampener to prevent such rapid force transmission.

The release assembly 84 further includes second conduit means generally indicated at 104. The second conduit means 104 comprises a second conduit 106 which is secured to the housing 60 by a suitable fitting 108. The construction of the second conduit 106 is identical to the construction as previously set forth for the first conduit 58. The second conduit 106 further includes a conduit length adjuster 110. The conduit length adjuster 110 is adapted to be secured to a support structure in the vehicle 12 for adjusting the overall effective length of the second conduit 106.

The release assembly 84 further includes a first biasing means 112. The first biasing means 112 is disposed between the housing 60 and the release lever 86. The first biasing means comprises a first spring 112 which upwardly biases the release lever 86 into the cap member 92. The locking assembly 68 includes a second biasing means or spring 114. The second spring 114 is disposed between the housing 60 and the locking lever 76. The second spring 114 biases the lip 77 of the locking lever 76 into engagement with the release lever 86. The first spring 112 has a greater biasing force than the second spring 114.

In an alternative embodiment of the present invention, the pawl means 75 and release assembly 84 are replaced by a solenoid. Specifically, a solenoid having an arm or piston extending outwardly therefrom engages a traveling catch on the first core element. The solenoid is energized or actuated to retract the piston from the traveling catch only in response to a force applied at the vehicle brake pedal. Hence, the first core element and thereby the gear selector lever, cannot move until the vehicle brake pedal is depressed.

Operation of the transmission lock assembly 10 is as follows. Once the assembly 10 is secured to the vehicle by securing the housing 60 to the vehicle steering column and the second core element 90 to the brake pedal 54 via the connector member 94, the assembly 10 is ready for operation. Initially, the key mechanism 52 is actuated by a key. In the initial locked position, the position shown in FIG. 2, the core element 64 can not move. Movement of the first core element 64 is prevented because the block cam 70 thereon and particularly the forward shoulder surface 72 engages the stop surface 80 of the locking lever 76. The locking lever 70 is biased into the block cam 70 by the second spring 114. Because the first core element 64 can not move, the push button 26 of the gear selector mechanism 20 can not be moved. Particular reference is made to FIG. 3. If the user attempts to push the button 28 when the locking lever 76 engages the cam 70, the force is transmitted through the push bar 44 and cam portion 40 of the push rod 30. Thus, the push rod 30 is attempted to be moved downwardly, as viewed in FIG. 3. This force would tend to pivot the pivot plate about the pin 38 (counterclockwise in FIG. 3). Because, the first core element 64 can not move, pivoting movement of the pivot plate 32 is prevented. Since the pivot plate 32 can not rotate about the pin 38, the push rod 30 can not move downwardly, as viewed in FIG. 3. This prevents the push button 28 from being pushed into the handle 26. Thus, in the locked position the button 28 can not be depressed and therefore, the gear selector lever 24 cannot be moved.

In order to move the assembly 10 from the locked position, as shown in FIG. 2 to the unlocked position, a force must be applied to the secondary end of the second core element 90. More specifically, since the secondary end of the second core element 90 is secured to the vehicle brake pedal 54, actuation of the brake pedal 54 tensions the second core element 90. The cap member 92 disposed on the primary end of the second core element 90 is then drawn downwardly as viewed in FIG. 2. This moves the release lever 84 downwardly against the biasing of the first spring 112 to overcome the biasing of the first spring 112. Thus, the force applied at the brake pedal 54 must overcome the biasing of the first spring 112. The release lever 84 engages the lip 77 on the locking lever 76 thereby moving the locking lever 76 downwardly about the pin 82 and against the biasing of the second spring 114. Therefore, the force applied to the brake pedal 54 must overcome the biasing of both the first 112 and second 114 springs. When the locking lever 76 is rotated sufficiently to remove the stop surface 80 from contact with front shoulder 72 of the cam 70, the first core element 64 is free to move within the housing 60. The button 28 can then be depressed because the pivot plate 32 is now free to rotate about the pivot pin 38. When the button is depressed, the push bar 30 moves downwardly as viewed in FIG. 3 and rotates the pivot plate 32 about the pin 38. This moves the first core element 64 in tension and moves the cam 70 rightwardly as viewed in FIG. 2. Because the push button 28 remains slightly depressed when the vehicle gear selector lever 24 is moved from the parked position to an operative position, the blocked cam 70 remains to the right of the locking lever 76 as viewed in FIG. 2. That is, the rearward slope surface 74 of the block cam will engage the inclined surface of the locking lever 76.

To return the assembly 10 to the locked condition, all that is necessary is that the gear selector lever 24 be moved from an operative position back to the parked position. The brake 54 need not be depressed in order to return the assembly to the locked condition. Specifically, when the gear selector lever 24 is in an operative position, the push rod 30 remains slightly down, and the block cam 70 is disposed to the right in the housing 60. In order to return it to the locked position, as shown in FIG. 2, movement of the gear selector lever 24 to the park position causes the spring biased push rod 30 to move upwardly as viewed in FIG. 3. This moves the pivot plate 32 and causes it to rotate about the pin 38. This force creates a push force on the first core element 64. This push force moves the blocking cam leftwardly as viewed in FIG. 2. Specifically, the rearward slope surfaced 64 of the cam 70 engages the inclined surface 78 of the locking lever 76 and forces it downwardly against the biasing of the second spring 114. The locking lever 76 is free to rotate about the pivot pin 82 independently of the release lever 86. When the push rod 30 is returned to its park position, the shoulder surface 72 of the cam 70 engages the stop surface 80 of the locking lever 76 as viewed in FIG. 2. The assembly is, thus, returned to the locked or initial position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A transmission lock assembly (10) of the type for retaining a vehicle gear selector mechanism (20) in the park position until a vehicle brake pedal (54) is actuated comprising:

first conduit means (56) for fixed attachment to the vehicle (12);

first core element means (64) slideably disposed in said first conduit means (56) and adapted for connection with the gear selector mechanism (20) for movement in said first conduit means (56);

locking means (68) engageable with said first core element means (64) and movable between locked and unlocked conditions for preventing movement of said first core element means (64) when in said locked condition, said locking means (68) including traveling catch means comprising a block cam (70) for fixed attachment to said first core element means (64) and pawl means (75) comprising a locking lever (76) movably disposed in said first conduit means (56) for moving between said locked and unlocked conditions, said locking lever (76) engaging said block cam (70) to prevent movement of said first core element means (64) in said locked condition to thereby prevent movement of the gear selector mechanism (20) from the parked position;

said assembly (10) characterized by release means (84) comprising second core element means (88) extending from a primary position adjacent said locking means (68) to a secondary position remote from said locking means (68) for operatively interconnecting said locking means (68) at said primary position and the brake pedal (54) at said secondary position for moving said locking means (68) between said locked and said unlocked conditions in response to a force applied by the brake pedal (54), said release means (84) further comprising a release lever (86) secured to said primary end of said second core element means (88) engaging said locking lever (76) and for moving same in response to a force applied at said secondary end of said second core element (88) by the brake pedal to move said locking lever (76) to said unlocked position and thereby allow movement of the gear selector mechanism (20) from the park position.

2. A transmission lock assembly as set forth in claim 1 further characterized by including first biasing means (112) for biasing said release lever into engagement with said second core element means (88).

3. A transmission lock assembly as set forth in claim 2 further characterized by including second biasing means (114) for biasing said locking lever (76) into engagement with said block cam (70).

4. A transmission lock assembly as set forth in claim 3 further characterized by said first conduit means (56) comprising a first conduit (58) and a housing (60).

5. A transmission lock assembly as set forth in claim 4 further characterized by said housing (60) containing a pivot pin (82) secured therein, said locking lever (76) and said release lever (86) pivotally connected to said pivot pin (82).

6. A transmission lock assembly as set forth in claim 5 further characterized by said first core element means (64) comprising a first core element (64) having said block cam (70) fixedly secured thereon.

7. A transmission lock assembly as set forth in claim 6 further characterized by said second core element means (88) comprising a second core element (90) having said primary and said secondary ends, and a cap member (92) fixedly disposed on said primary end of said second core element (90), said cap member (92) engaging said release lever (86) for moving same in response to a force applied to said secondary end.

8. A transmission lock assembly as set forth in claim 7 further characterized by said second core element means (88) further comprising connection means (94) secured on said secondary end thereof adapted to connect said second core element (90) with the brake pedal (54) and move said second core element (90) in response to a force applied thereto by the brake pedal (54).

9. A transmission lock assembly as set forth in claim 8 further characterized by said second conduit means (104) comprising a second conduit (106) secured to said housing (60), and conduit length adjustor means (11) adapted to be secured to the vehicle (12) for adjusting the overall length of said second conduit (106).

10. A transmission lock assembly as set forth in claim 9 further characterized by said housing (60) including stop means (83) for limiting pivoting movement of said locking lever (76).

11. A transmission lock assembly as set forth in claim 10 further characterized by said stop means (83) comprising a flange (83) integral with said housing (60) and extending inwardly therefrom.

12. A transmission lock assembly as set forth in claim 11 further characterized by each of said first (112) and said second (114) biasing means comprising first (112) and second (114) springs, said first spring (112) having a greater biasing force than said second spring (114).

13. A transmission lock assembly as set forth in claim 12 further characterized by said block cam (70) including a forward annular shoulder surface (72) and a rearward annular sloped surface (74), said shoulder surface (72) engaging said locking lever (76) in the absence of a force applied to said secondary end of said second core element (90) to thereby prevent movement of the gear selector mechanism (20) from the park position.

14. A transmission lock assembly as set forth in claim 13 further characterized by said locking lever (76) including an inclined surface (78) for engaging said sloped surface (74) of said block cam (70) and allowing said block cam (70) to pass thereover and overcome the biasing of said second spring (114) to allow the gear selector mechanism (20) to return to the park position.

15. A transmission lock assembly as set forth in claim 14 further characterized by said locking lever (76) including a stop surface (80) extending downwardly from said inclined surface (78) for engaging said shoulder surface (72) of said block cam (70) to prevent movement of said block cam (70) past said locking lever (76) when said locking lever (76) is in said locked condition.

16. A transmission lock assembly as set forth in claim 15 further characterized by said locking lever (76) further including a lip (77) extending outwardly from said stop surface (80), said lip (77) normally engaging said release lever (86).

17. A vehicle transmission lock assembly of the type for retaining a vehicle gear selector mechanism (20) in the parked position until a vehicle brake pedal (54) is actuated comprising:

a vehicle (12) having an engine (14) for supplying power to said vehicle (12) and a transmission (16) to distribute the power from said engine (14);

a gear selector mechanism (20) for operating said transmission (16) by moving between a parked position and a plurality of operative positions;

a brake pedal (54) to receive a force and to impede movement of said vehicle (12);

first conduit means (56) for fixed attachment to said vehicle (12);

first core element means (64) having a first end connected to said gear selector mechanism (20) and slideably disposed in said first conduit means (56) for movement and said first conduit means (56);

said assembly characterized by locking means (68) engageable with said first core element means (64) at a position remote from said first end and moveable between locked and unlocked conditions in response to movement of said break pedal (54) for preventing movement of said first core element means (64) and therefor said gear selector mechanism (20) when in said locked condition and for allowing movement of said first core element means (64) when in said unlocked condition.

18. A transmission lock assembly as set forth in claim 17 further characterized by said locking means (68) including release means (84) adapted to mechanically interconnect said locking means (68) with said brake pedal (54) for moving said locking means (68) to said unlocked condition to permit movement of said first core element means (64) only in response to a force applied to said brake pedal (56).

19. A transmission lock assembly as set forth in claim 18 further characterized by said release means (84) comprising second conduit means (104) and second core element means (88) for interconnecting said release means (84) with said brake pedal (54) for moving said locking means (68) to said unlocked condition in response to a force applied to said brake pedal (54).

20. A transmission lock assembly as set forth in claim 19 further characterized by said release means (84) further comprising release lever means (86) secured to said second core element means (88) for moving said locking means (68) to said unlocked condition in response to a force applied to said brake pedal (54).

21. A transmission lock assembly as set forth in claim 20 further characterized by said locking means (68) including traveling catch means (70) for fixed attachment to said first core element means (64).

22. A transmission lock assembly as set forth in claim 21 further characterized by said locking means (68) including pawl means (75) moveably disposed in said first conduit means (56) for moving between said locked and unlocked conditions, said pawl means (75) engaging said catch means (70) to prevent movement of said first core element means (64) in said locked condition.

23. A transmission lock assembly as set forth in claim 22 further characterized by said release lever means (86) comprising a release lever (86), said release lever (86) engaging said pawl means (75) and moving same in response to a force applied to said brake pedal (54).

24. A transmission lock assembly as set forth in claim 22 further characterized by said traveling catch means (70) comprising a block cam (70) fixedly secured to said first core element means (64).

25. A transmission lock assembly as set forth in claim 24 further characterized by said pawl means (75) comprising a locking lever (76), said locking lever (76) engaging said block cam (70) and preventing movement thereof when said locking lever (70) is in said locked condition thereby preventing movement of said gear selector mechanism (20) from the park position.

26. A transmission lock assembly as set forth in claim 25 further characterized by including first biasing means (112) for biasing said release lever (86) into engagement with said second core element means (88).

27. A transmission lock assembly as set forth in claim 26 further characterized by including second biasing means (114) for biasing said locking lever (76) into engagement with said block cam (70).

28. A transmission lock assembly as set forth in claim 27 further characterized by said first conduit means (56) comprising a first conduit (58) and a housing (60).

29. A transmission lock assembly as set forth in claim 28 further characterized by said housing (60) containing a pivot pin (82) secured therein, said locking lever (76) and said release lever (86) pivotally connected to said pivot pin (82).

30. A transmission lock assembly as set forth in claim 29 further characterized by said first core element means (64) comprising a first core element (64) having said block cam (70) fixedly secured thereon.

31. A transmission lock assembly as set forth in claim 30 further characterized by said second core element means (88) comprising a second core element (90) having primary and secondary ends, and a cap member (92) fixedly disposed on said primary end of said second core element (90), said cap member (92) engaging said release lever (86) for moving same in response to a force applied to said brake pedal (54).

32. A transmission lock assembly as set forth in claim 31 further characterized by said second core element means (88) further comprising connection means (94) secured on said secondary end thereof to connect said second core element (90) with said brake pedal (54) and moving said second core element (90) in response to a force applied to said brake pedal (54).

33. A transmission lock assembly as set forth in claim 32 further characterized by said second conduit means (104) comprising a second conduit (106) secured to said housing (60), and conduit length adjustor means (110) adapted to be secured to said vehicle (12) for adjusting the overall length of said second conduit (106).

34. A transmission lock assembly as set forth in claim 33 further characterized by said housing (60) including stop means (83) for limiting pivoting movement of said locking lever (76).

35. A transmission lock assembly as set forth in claim 34 further characterized by said stop means (83) comprising a flange (83) integral with said housing (60) and extending inwardly therefrom.

36. A transmission lock assembly as set forth in claim 35 further characterized by said first (112) and said second (114) biasing means comprising first (112) and second (114) springs respectively, said first spring (112) having a greater biasing force than said second spring (114).

37. A transmission lock assembly as set forth in claim 36 further characterized by said block cam (70) including a forward annular shoulder surface (72) and a rearward annular slope surface (74), said shoulder surface (72) engaging said locking lever (76) in the absence of a force applied to said brake pedal (54) to thereby prevent movement of said gear selector mechanism (20) from the park position to one of the operative positions.

38. A transmission lock assembly as set forth in claim 37 further characterized by said locking lever (76) including an inclined surface (78) for engaging said sloped surface (74) of said block cam (70) and allowing said block cam (70) to pass thereover and overcome the biasing of said second spring (114) to allow said gear selector mechanism (20) to move from one of the operative positions to the park position in the absence of a force applied to said brake pedal (54).

39. A transmission lock assembly as set forth in claim 38 further characterized by said locking lever (76) including a stop surface (80) extending downwardly from said inclined surface (78) for engaging said shoulder surface (72) of said block cam (70) to prevent movement of said block cam (70) past said locking lever (76) when said locking lever (76) is in said locked condition.

40. A transmission lock assembly as set forth in claim 39 further characterized by said locking lever (76) further including a lip (77) extending outwardly from said stop surface (80), said lip (77) normally engaging said release lever (86).

41. A transmission lock assembly (10) for retaining a gear selector mechanism (20) in the parked position until a vehicle brake pedal (54) is actuated comprising:
   a first conduit (58);
   a housing (60) secured to said first conduit (58) and adapted to be secured to the vehicle (12);
   a first core element (64) connected to the gear selector mechanism (20) and slideably supported by said first conduit (58) and said housing (60);
   a blocked cam (70) fixedly disposed on said first core element (64) and disposed in said housing (60);
   a locking lever (76) pivotally disposed in said housing and moveable between locked and unlocked conditions for engaging said block cam (70) and preventing movement of same in said locked condition;
   a release lever (86) pivotally secured in said housing (60) and engaging said locking lever (76);
   a second conduit (106) secured to said housing (60) and adapted for connection to the vehicle (12);
   and a second core element (90) slideably retained by said second conduit (106) and secured at a primary end to said release lever (86), said second core element (90) extending to a secondary end remote from said primary end to move said locking lever (76) from said locked condition to said unlocked condition in response to a force applied to said secondary end of said second core element (90).

* * * * *